US008631111B2

(12) United States Patent
Kano et al.

(10) Patent No.: US 8,631,111 B2
(45) Date of Patent: Jan. 14, 2014

(54) METHOD AND APPARATUS OF SELECTION INTERFACE BY QUEUE AND WORKLOAD FOR STORAGE OPERATION

(75) Inventors: Yoshiki Kano, Bellevue, WA (US);
William Zietzke, Covington, WA (US);
Dan Ritchie, Issaquah, WA (US);
Yasuto Nishii, Redmond, WA (US);
Fumimasa Nakane, Redmond, WA (US)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 13/005,037

(22) Filed: Jan. 12, 2011

(65) Prior Publication Data

US 2012/0179799 A1 Jul. 12, 2012

(51) Int. Cl.
*G06F 15/173* (2006.01)

(52) U.S. Cl.
USPC ............................................. 709/223

(58) Field of Classification Search
USPC .......................................... 709/201, 203, 220
See application file for complete search history.

(56) References Cited

U.S. PATENT DOCUMENTS

| | | | |
|---|---|---|---|
| 7,197,609 B2 | 3/2007 | Kano | |
| 7,512,888 B2 | 3/2009 | Sugino et al. | |
| 7,752,362 B2 * | 7/2010 | Nishimoto et al. | 710/74 |
| 2002/0143903 A1 | 10/2002 | Uratani et al. | |
| 2004/0030730 A1 | 2/2004 | Arai et al. | |
| 2007/0294684 A1 * | 12/2007 | Kumashiro et al. | 717/168 |
| 2009/0210452 A1 * | 8/2009 | Ishii | 707/200 |
| 2010/0054066 A1 * | 3/2010 | Kajigaya et al. | 365/207 |
| 2010/0082854 A1 * | 4/2010 | Rossen et al. | 710/39 |
| 2011/0145817 A1 * | 6/2011 | Grzybowski | 718/1 |

* cited by examiner

*Primary Examiner* — Andrew Lai
*Assistant Examiner* — Zhiren Qin
(74) *Attorney, Agent, or Firm* — Mattingly & Malur, PC

(57) ABSTRACT

A method selects an interface in a storage subsystem for processing storage operations, each interface associated with a corresponding processor. A management server has plural providers, each for executing storage operations on one of the processors via the corresponding interface. The method comprises: collecting information on status of each of the providers; based on the status of each provider, determining an operational characteristic of operation time as a function of a number of operational units for each provider; comparing the operational characteristics of the providers; for a given number of operational units in the storage operations to be processed, selecting from among the providers one provider which has the lowest operation time for the given number of operational units; and identifying the interface based on the selected provider to be used for executing the storage operations via the identified interface on the corresponding processor.

17 Claims, 12 Drawing Sheets

(Logical Configuration)

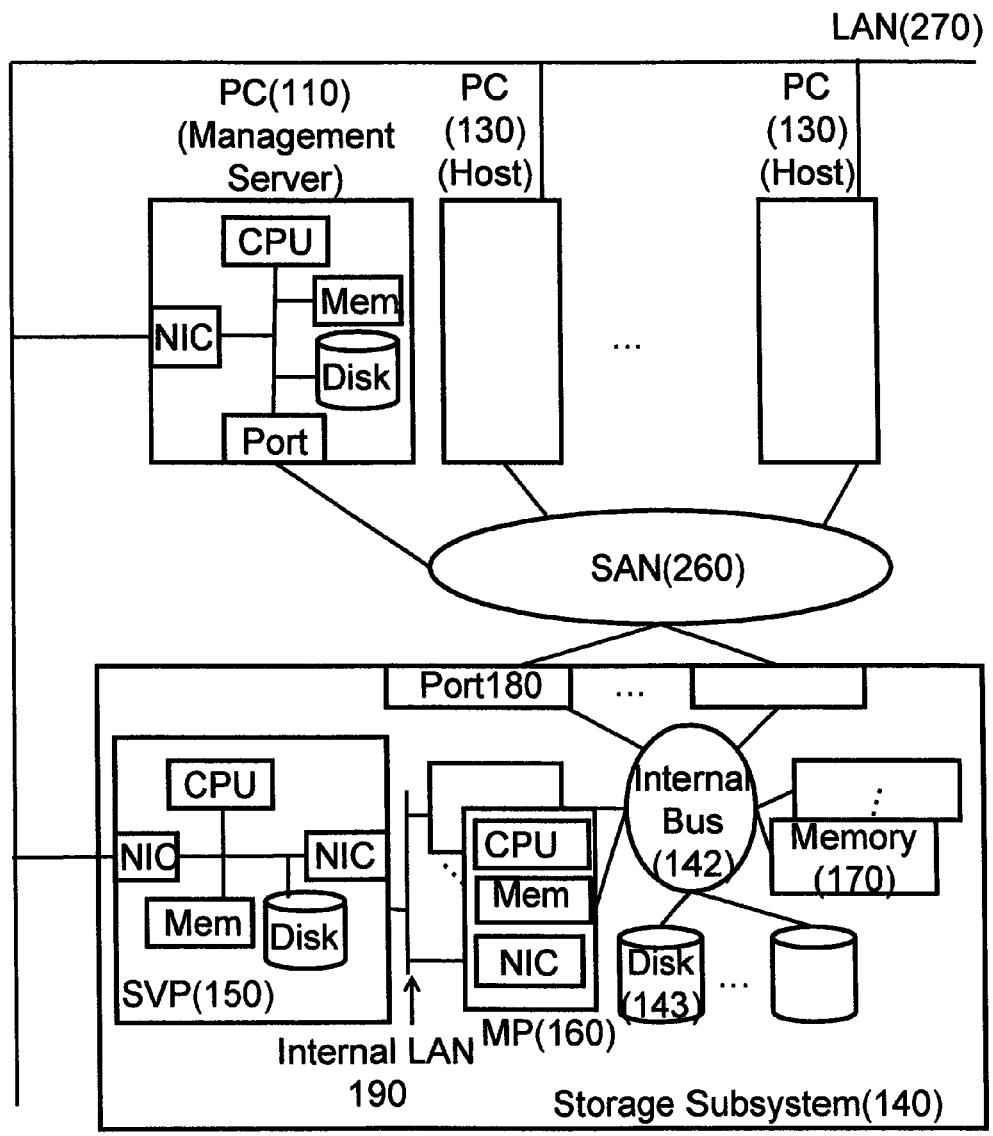
Figure.1(Physical Configuration)

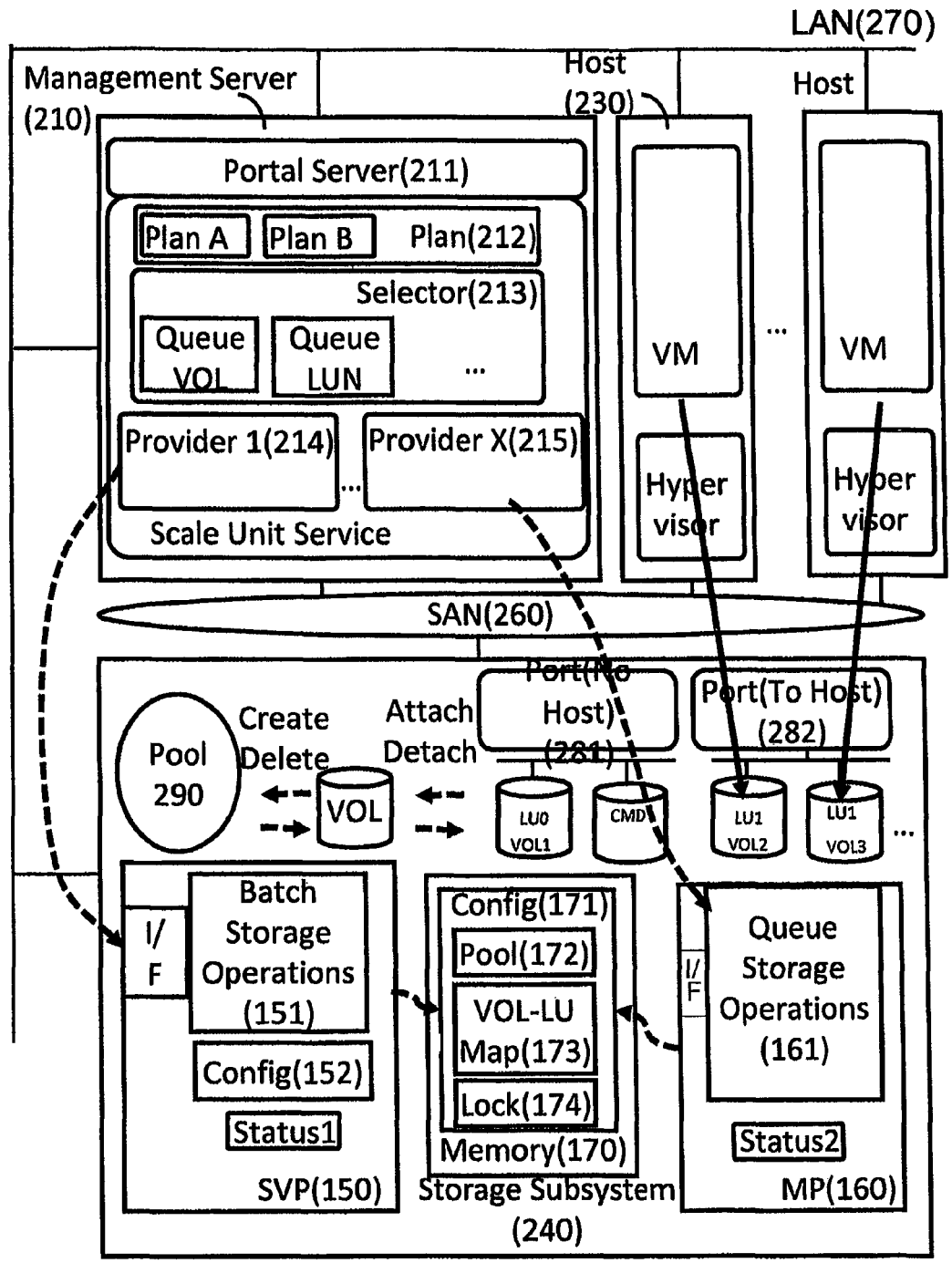
Figure.2(Logical Configuration)

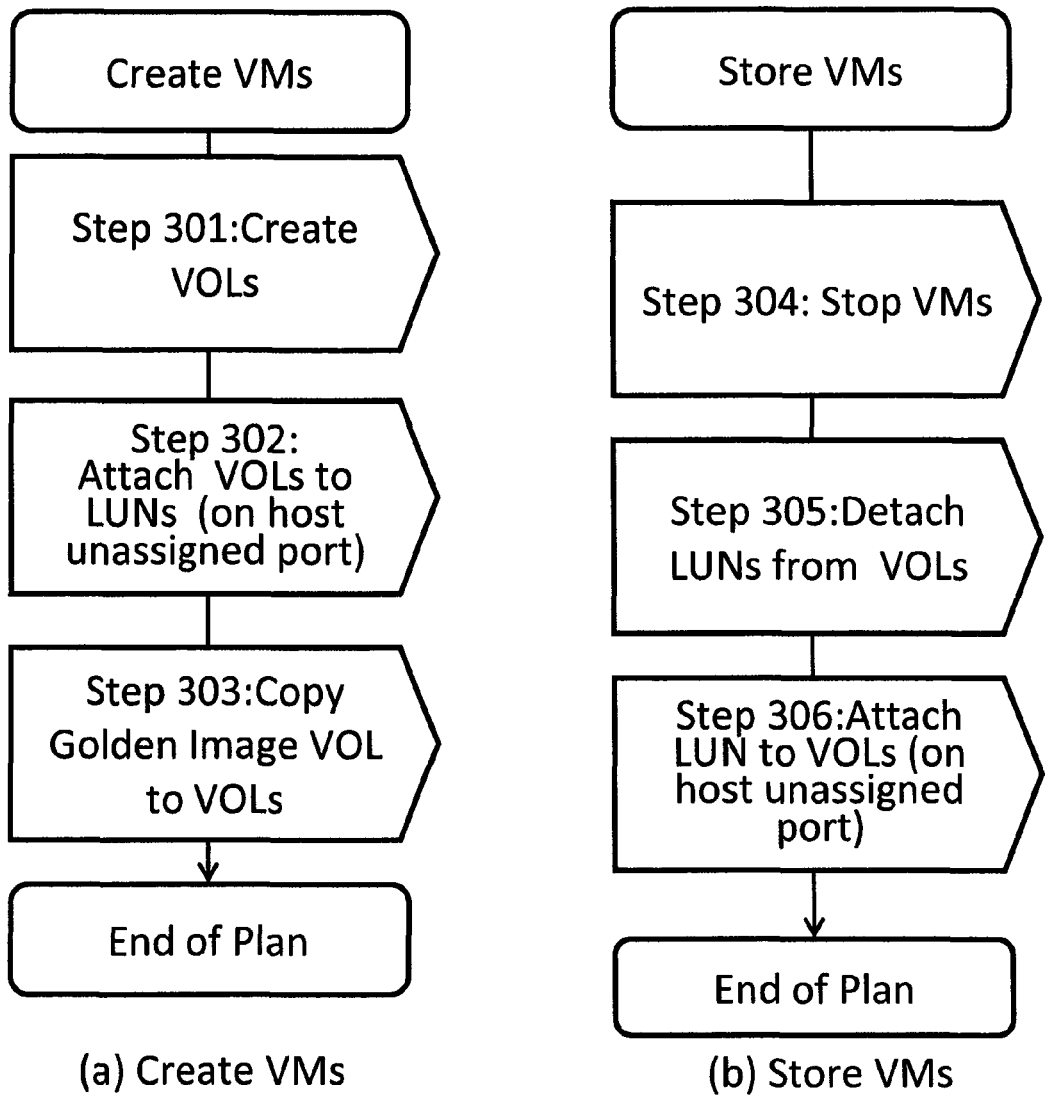
Figure.3(Plan)

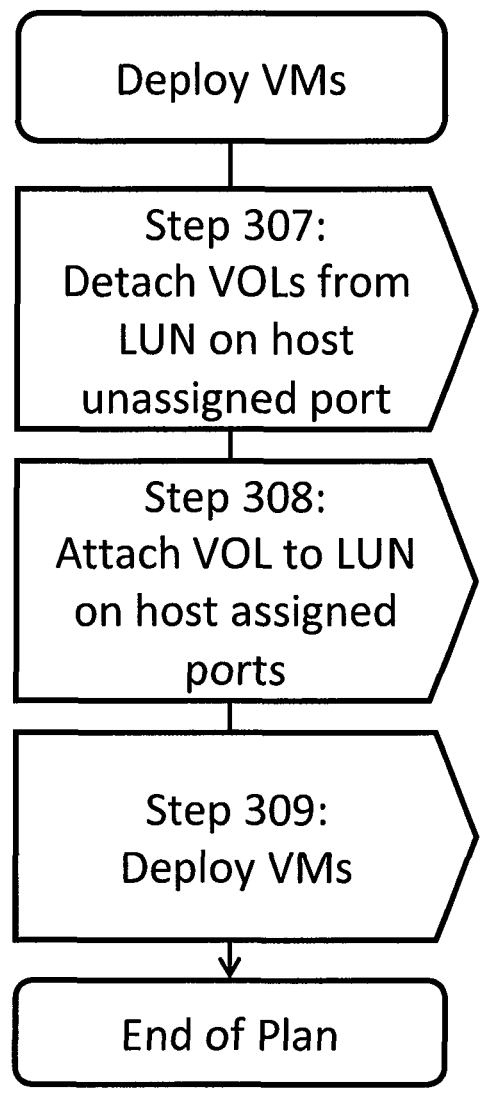
(c) Deploy VMs
Figure.4(Plan)

| #(501) | Plan(502) | Num of VMs(503) | VM IDs (504) |
|---|---|---|---|
| 1 | Create VMs | 100 | - |
| 2 | Create VMs | 10 | - |
| 3 | Store VMs | 3 | 1,4,6 |
| 4 | Deploy VMs | 1 | 2 |
| ⋮ | ⋮ | ⋮ | |
| ... | ... | ... | ... |

Figure.5 (Plan & VM ID)

| Queue (601) | Plan Job(602) | Storage Operation(603) | Parameters (604) |
|---|---|---|---|
| ... | ... | ... | ... |
| N | M | AttachLUN (VOL, LUN, Port) | (10,2,3) |
| ⋮ | ⋮ | ⋮ | ⋮ |
| 3 | 1 | AttachLUN (VOL, LUN, Port) | (10,2,3) |
| 2 | 1 | Attach LUN (VOL, LUN, Port) | (10,2,2) |
| 1 | 1 | Attach LUN (VOL, LUN, Port) | (10,1,1) |

Figure.6 (Queue Table for storage operations)

| Queue # (701) | Storage Operation (702) | Parameters (703) |
|---|---|---|
| 1 | Attach LUN (VOL, LUN, Port) | (10,1,1) |
| 2 | Detach LUN (VOL, LUN, Port) | (10,2,2) |
| 3 | AttachLUN (VOL, LUN, Port) | (10,2,3) |
| ⋮ | ⋮ | ⋮ |
| ... | ... | ... |
| N | ... | ... |

Figure.7 (Batch Table on SVP)

Current Queue: l(804)   Max Queue: m(805)

| Queue # (801) | Storage Operation(802) | Parameters (803) |
|---|---|---|
| ... | ... | ... |
| ... | ... | ... |
| ⋮ | ⋮ | ⋮ |

| | | |
|---|---|---|
| 3 | AttachLUN (VOL, LUN, Port) | (3,2,3) |
| 2 | Detach LUN (VOL, LUN, Port) | (20,2,2) |
| 1 | Attach LUN (VOL, LUN, Port) | (10,1,1) |

Figure.8 (Queue Table on MP)

| VOL(901) | Port (902) | LU (903) |
|---|---|---|
| 1 | 0 | 1 |
| 2 | 0 | 2 |
| ... | ... | ... |
| 100 | 1 | 1 |
| ... | ... | ... |
| ... | ... | ... |

Figure.9 (Config Table on Storage System)

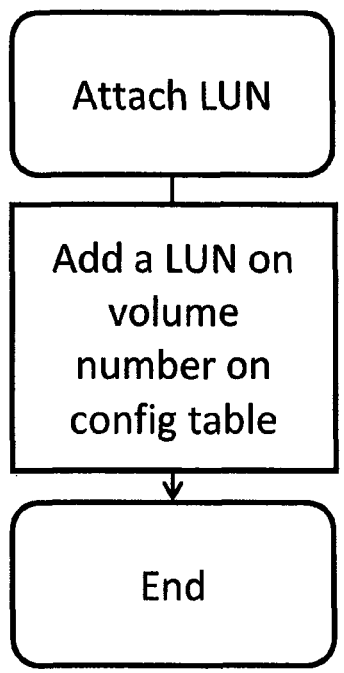
(a) Attach LUN
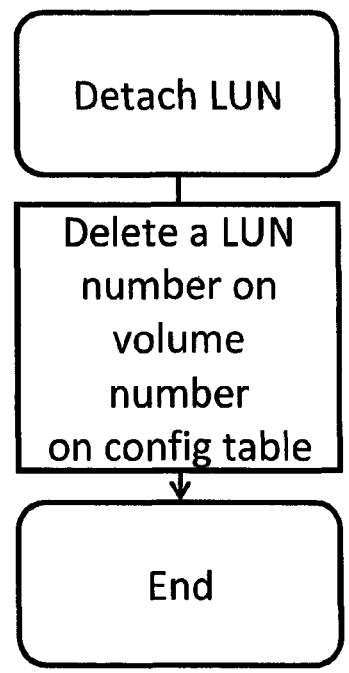
(b) Detach LUN
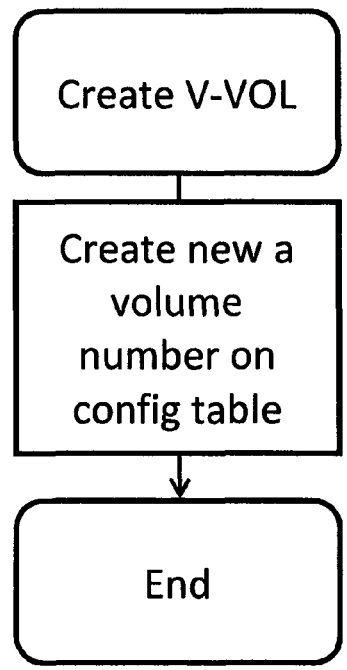
(c) Create volume
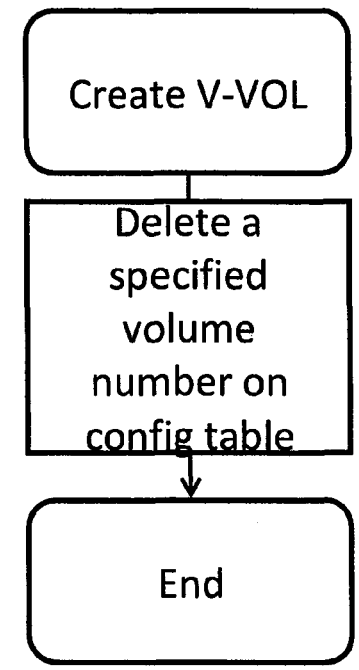
(b) Delete volume
Figure.10 (Storage Operation)

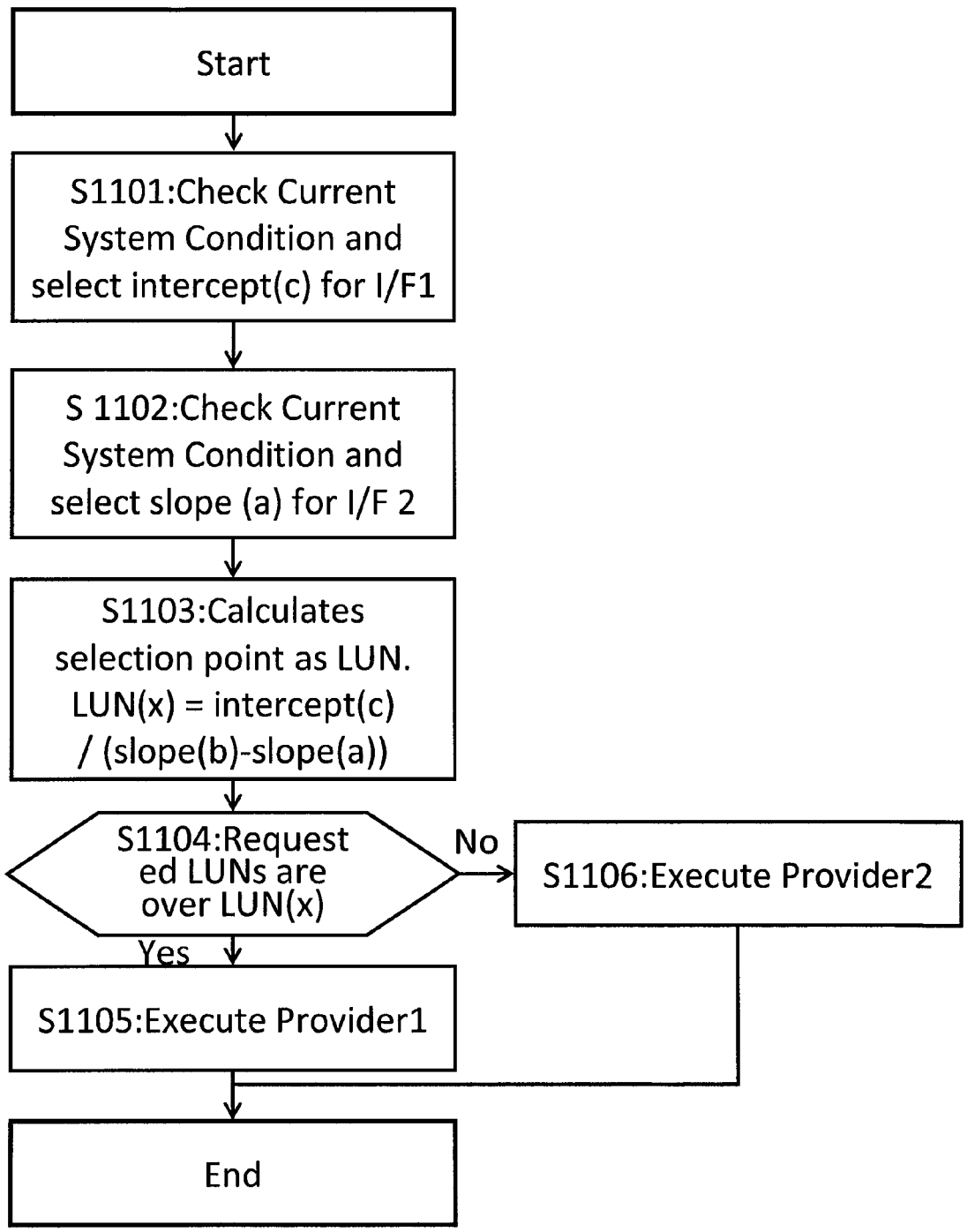
Figure. 11 (Selecting Logic)

METHOD AND APPARATUS OF SELECTION INTERFACE BY QUEUE AND WORKLOAD FOR STORAGE OPERATION

BACKGROUND OF THE INVENTION

The present invention relates generally to storage systems and, more particularly, to selecting an interface by queue and workload for storage operation.

Storage subsystem provides different characteristic interfaces (I/Fs) for storage management, and the I/Fs' characteristics are changed based on condition of I/F processing and the queue of the I/Fs. It is hard to select an I/F efficiently. For example, serial operation I/F (e.g., RMLIB API) is liner order time by the number of storage operations (e.g., attach/detach LUN operations). The slope of liner is changed by the storage's queue length for storage operation batch operation I/F (e.g., RMI API), and it is almost flat performance for a set of storage operations even regardless of the number of storage operations. The intercept of the flat liner is changed by the condition of the SerVice Processor or SVP (update<normal<refresh). Therefore, the user or the system cannot select the appropriate I/F.

One example of in-band storage management I/F, RMLIB, is described in U.S. Patent Application Publication No. 2002/0143903. In that disclosure, the storage system 30 may implement one or more command devices, the agent 29 may be equal to the operation API (RMLIB), and the one or more command devices may be functionally equal to command devices (CMs or CMD in this disclosure). The agent 29 is able to provide an application program interface (API) or a command line interface (CLI) for use in providing instructions for coupling operations to logical units (LUs) in the storage system 30. That disclosure does not teach a queue for requests on CMD. However, it is necessary to process requests from several hosts. The I/F provides capabilities to attach LUN to volume, detach LUN from volume, and to provide copy operation. Examples of the capabilities of attach and detach operations are found in U.S. Pat. No. 7,197,609.

One example of out-band storage interface RMI on SVP is described in U.S. Pat. No. 7,512,888. In that disclosure, FIG. 9 shows RMI server 40h which provides I/F to control from another management server. The configuration of storage is taught in the prior art, and an example of the refresh operation is described in U.S. Patent Application Publication No. 2004/0030730. That disclosure does not teach a batch operation. For example, the management software sends a set of storage operations to storage subsystems. Then each storage subsystem executes it once. However, it is a considerable technical operation. The behavior of I/F, especially the operation speed, is also not disclosed well.

BRIEF SUMMARY OF THE INVENTION

Exemplary embodiments of the invention provide, in management software, an I/F selection module called the factory. The selection module evaluates efficient executable I/F based on the queue of requests for storage management and the condition of I/F execution on storage subsystem. If there are at least two different I/Fs, this selector can select one I/F and execute user execute command considering subsystem condition. Nothing in the prior art discloses using both characteristic I/Fs, or choosing one I/F based on their behavior (namely, queue of requests and condition such as workload of I/F execution).

An aspect of the present invention is directed to a method of selecting an interface from a plurality of interfaces in a storage subsystem for processing storage operations received by the storage subsystem, by a selector in a management server coupled with the storage subsystem via a network. The plurality of interfaces include a queue interface for queue storage operations and a batch interface for batch storage operations, each interface being associated with a corresponding processor of a plurality of processors in the storage subsystem. The management server has a plurality of providers, each provider configured to execute storage operations on one of the processors via the corresponding interface. The method comprises: collecting information on status of each of the providers; based on the status of each provider, determining an operational characteristic of operation time as a function of a number of operational units for each provider; comparing the operational characteristics of the providers; for a given number of operational units in the received storage operations to be processed, selecting from among the providers one provider which has the lowest operation time for the given number of operational units; and identifying the interface based on the selected provider to be used for executing the received storage operations via the identified interface on the corresponding processor.

In some embodiments, the providers include a queue provider configured to execute storage operations on a storage processor of the plurality of processors via the queue interface, and, if the queue provider is selected, the queue provider executes the received storage operations in series via the queue interface on the storage processor. The providers include a batch provider configured to execute storage operations on a service processor of the plurality of processors via the batch interface, and, if the batch provider is selected, the batch provider executes the received storage operations in batch via the batch interface on the service processor.

In specific embodiments, the providers include a queue provider configured to execute storage operations on a storage processor of the plurality of processors via the queue interface; wherein the status of the queue provider depends on a size of a queue for storage operations between zero queue mode and maximum queue mode; and wherein the operation time increases with the size of the queue, and the maximum queue mode requires maximum operation time and the zero queue mode requires minimum operation time. The providers include a batch provider configured to execute storage operations on a service processor of the plurality of processors via the batch interface; wherein the status of the batch provider depends on whether the service processor operates under normal mode, refresh mode, or updating mode; wherein the refresh mode requires more operation time than the normal mode, for uploading configuration stored in a memory of the storage subsystem to the service provider and downloading the configuration from the service provider to the memory after modifying the configuration based on the received storage operations; and wherein the updating mode requires less operation time than the normal mode, for downloading the configuration from the service provider to the memory after modifying the configuration without need to upload configuration stored in the memory of the storage subsystem to the service provider. Modifying the configuration includes one or more of attaching logical unit number, detaching logical unit number, creating volume, and deleting volume. The operational units are logical unit numbers.

Another aspect of the invention is directed to a management server in an information system which includes a storage subsystem and one or more host computers coupled via a network with the management server. The storage subsystem has a plurality of interfaces, which include a queue interface for queue storage operations and a batch interface for batch storage operations, each interface being associated with a corresponding processor of a plurality of processors in the storage subsystem for processing storage operations received by the storage subsystem. The management server comprises a plurality of providers, each provider configured to execute storage operations on one of the processors via the corresponding interface; and a selector configured to: collect information on status of each of the providers; based on the status of each provider, determine an operational characteristic of operation time as a function of a number of operational units for each provider; compare the operational characteristics of the providers; for a given number of operational units in the received storage operations to be processed, select from among the providers one provider which has the lowest operation time for the given number of operational units; and identify the interface based on the selected provider to be used for executing the received storage operations via the identified interface on the corresponding processor.

Another aspect of this invention is directed to a computer-readable storage medium storing a plurality of instructions for controlling a data processor in a management server to select an interface from a plurality of interfaces in a storage subsystem for processing storage operations received by the storage subsystem. The storage subsystem is coupled with the management server via a network. The plurality of interfaces include a queue interface for queue storage operations and a batch interface for batch storage operations, each interface being associated with a corresponding processor of a plurality of processors in the storage subsystem for processing storage operations received by the storage subsystem. The management server has a plurality of providers, each provider configured to execute storage operations on one of the processors via the corresponding interface. The plurality of instructions comprise: instructions that cause the data processor to collect information on status of each of the providers; instructions that cause the data processor to, based on the status of each provider, determine an operational characteristic of operation time as a function of a number of operational units for each provider; instructions that cause the data processor to compare the operational characteristics of the providers; instructions that cause the data processor to, for a given number of operational units in the received storage operations to be processed, select from among the providers one provider which has the lowest operation time for the given number of operational units; and instructions that cause the data processor to identify the interface based on the selected provider to be used for executing the received storage operations via the identified interface on the corresponding processor.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration of an information system in which the method and apparatus of the invention may be applied.

FIG. 2 illustrates an example of a logical configuration of the invention applied to the architecture of FIG. 1.

FIG. 3(a) shows an example of a plan to create virtual machines.

FIG. 3(b) shows an example of a plan to store virtual machines.

FIG. 4 shows an example of a plan to deploy virtual machines.

FIG. 5 shows example of an executed plans table providing details for a list of executed plans.

FIG. 6 shows an example of a queue table on the selector of FIG. 2 for storage operations toward each I/F.

FIG. 7 shows an example of a batch table for batch storage operations on the service processor (SVP) of FIG. 2.

FIG. 8 shows an example of an operation queue table for queue storage operations on the storage processor (MP) of FIG. 2.

FIG. 9 shows an example of a configuration table on the storage subsystem.

FIG. 10 shows examples of flow diagrams illustrating how the MP or the SVP modifies the configuration table.

FIG. 11 shows an example of a flow diagram illustrating how the selector selects a provider.

DETAILED DESCRIPTION OF THE INVENTION

Figure 12:
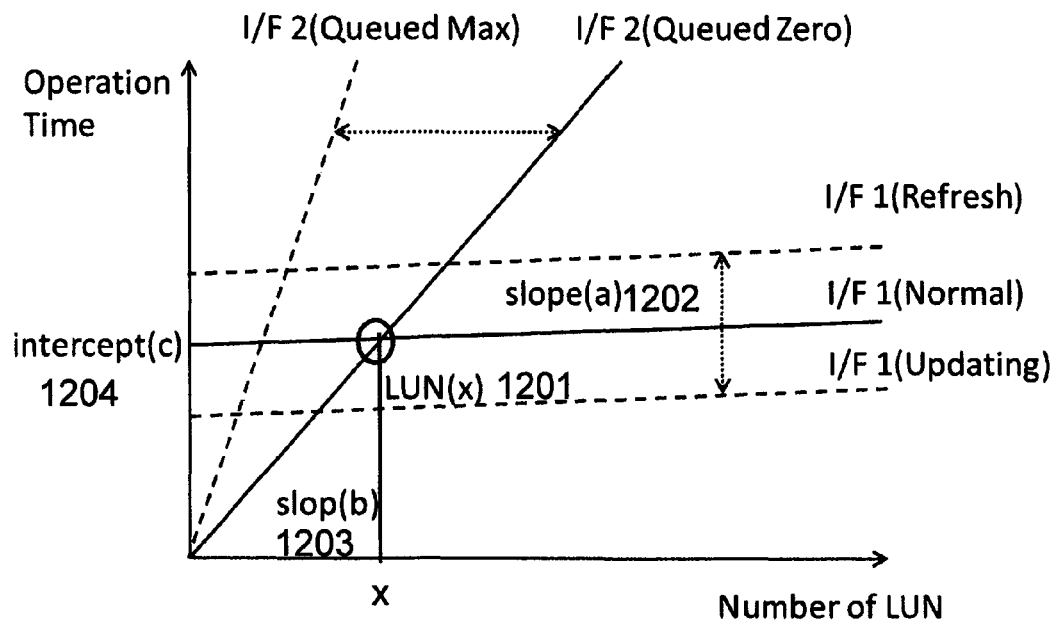
FIG. 12(a) shows an example of an intercepts table.
FIG. 12(b) shows an example of a slopes table.
FIG. 12(c) is a plot graphically illustrating a sample calculation of a crossing point between the operational characteristics of two interfaces.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for selecting an interface by queue and workload for storage operation.

FIG. 1 illustrates an example of a hardware configuration of an information system in which the method and apparatus of the invention may be applied. This system has personal computers (PCs) including a management server 110 and at least one host 130, and a storage subsystem 140. The PCs connect to the storage subsystem 140 via a network 260 such as a SAN (Storage Area Network). The SAN is typically a fiber channel network, and hence includes a Fiber Channel Switch and cables. The SAN may use IP network such as iSCSI and Ethernet network as Fiber Channel over Ethernet. In this case, we use Ethernet cables and Ethernet switch as the network switch. The PCs 110, 130 and storage subsystem 140 are connected by a LAN (Local Area Network) 270. The LAN uses Ethernet network in this embodiment, and it includes Ethernet switch and cables.

Each PC 110, 130 is a general computer, and includes a CPU, a memory, and a disk. It has a Host Bus Adapter (HBA) for storage to connect to the SAN 260. The HBA has a unique identifier in the form of world wide name (WWN). The PC also has a Network Interface Card (NIC) to connect to the LAN 270. The NIC has a MAC address.

The storage subsystem 140 has storage processors (MPs) 160, disks 143, memories 170, ports 180 to connect to the SAN 260, and SerVice Processor (SVP) 150. The ports, MPs, disks, and memories are connected by an internal bus 142. The memory is NVRAM in this embodiment. The port, memory, disk, MP, SVP, and internal bus can be redundant for system reliability. The MP 160 has a CPU, a local memory, and a NIC. Using this NIC, the MP 160 can communicate with the SVP 150. The SVP 150 has two NICs for an internal LAN 190 and the external LAN 270, CPU, memory 170, and disk 143.

FIG. 2 illustrates an example of a logical configuration of the invention applied to the architecture of FIG. 1. The system has a data center management server or simply management server 210, at least one virtual machine runnable server 230, and the storage subsystem 240. The management server may use the PC 110 in FIG. 1. It has a portal server 211, plans 212 for execution, operation queues for Virtual Volume (V-VOL) and LUN and the like to be selected by a selector 213, and hardware providers 214, 215 for each interface (I/F). The portal server represents the graphical user interface (GUI) for the virtual machine administrator to execute "Plans" 212. The plans 212 have several execution acts based on the business object. For example, a user may want to create a virtual machine on the host 230. Such a plan 212 has a set of acts. An act is a unit of storage or some other module execution. One of the acts executes storage operation toward the storage subsystem 240. One or more storage operation acts are queued for each storage operation queue in the selector 213. In this example, the queue is Queue VOL (V-VOL) for the operation of creating or deleting a volume on the storage subsystem 240, Queue LU (Logical Unit) for the operation of attaching or detaching a volume to LU, and Queue Copy for the operation of copying a volume. Based on the characteristics of the queued storage operations, the queue selector 213 selects an execution I/F provider. The details of the selection method are described below. Each provider 214, 215 is an execution module of one storage operation I/F. For example, Provider 1 executes storage operations on the SVP 150 using the SVP I/F. As a characteristic processing, the SVP 150 can execute a set of storage operations at one execution. Provider 2 executes each storage operation on the storage processor (shown as MP in FIG. 2) through the MP I/F which is provided by the storage subsystem 240. Provider 1 and Provider 2 have their status values to find the status of the SVP or the status of the MP. The Providers inquire the status of the MP or SVP using their respective I/Fs. As an example, one may use RMI I/F as Provider 1 I/F and RMLIB I/F as Provider 2 I/F. The RMI API and the RMLIB I/F are known in the art.

Storage operations are sent from the management server 210 and received by the storage subsystem 240. The storage operations can be received by the batch storage operations 151 of the SVP 150 or the queue storage operations 161 of the MP 160. The queue manages the order of storage operations and waiting operations. On execution, the SVP 150 or MP 160 modifies the configuration (or config) table 171 on the memory 170. The modification by the SVP 150 is batch style. As such, the SVP 150 executes a set of storage operations requested by the management server 210, and it modifies the received operations as a set of operations on the configuration table 171 in the memory 170 after taking a lock 174 from the memory 170. The configuration table 171 has volume pool information 172, volume to LU mapping table 173, and lock 174 for each table. To change the configuration table 171, it is necessary to upload the configuration table from the memory 170 to the SVP's memory as Config 152. After setting the operations, the SVP 150 downloads the Config 152 to the memory 170. Based on the operations sent from the storage management server 210, the storage subsystem 240 can create a volume, attach Logical Unit to the volume in order to be visible from the host 230, or detach Logical Unit from the volume and delete Volume. The Logical Unit is the representation of the volume toward the host 230. As an identifier, the Logical Unit (LU) uses a Logical Unit Number (LUN). The LUN is assigned to several ports. In this embodiment, there are two types of ports. The first type of port is a host unassigned port 281 whereby no host has assigned volume on the port 281. If the volume is on this port, it means that no host uses the volume and the user may use the volume as a candidate. The second type of port is a host assigned port 282 whereby a host 230 already assigns and uses the volume on the port.

As discussed above, one of the operations that the storage subsystem 240 may perform is to create a volume. The creation of volume may involve allocation use technology (i.e., thin provisioning technology). As such, a pool of storage 290 is used for the creation and is protected by RAID (redundant array of independent disks) 0, 1, 2, 3, 4, 6. The pool information of the pool of storage 290 is stored on the configuration table 171. Alternatively, the creation may allocate the entire volume capacity.

By the storage subsystem 240, the host 230 can use Volume with LUN via the port 282. This embodiment assumes that the virtual machine uses this volume. As such, the host 230 has a hypervisor and a virtual machine (VM). The VM can be runnable on the hypervisor.

FIG. 3(*a*) shows an example of a plan to create VMs. FIG. 3(*b*) shows an example of a plan to store VMs. FIG. 4 shows an example of a plan to deploy VMs. These are examples of plans 212 executed by the management server 210 in FIG. 2.

To create and deploy VMs as seen in FIG. 3(*a*), as input of act, the user specifies the golden image of the volume's number. In step 301, the management server 210 executes Create VOLs act to create volumes. In the present embodiment, the creation of volume involves thin provisioning to assign storage resource as pages such as 42 MB per a page on write operation from the pool 172 shown in FIG. 2. This page size is merely an example. Another number may also be applicable. Alternatively, it may allocate the entire volume resource at creation time. In step 302, the management server 210 executes Attach LUNs to VOLs act to attach logical unit numbers to create the volumes. The LUNs are attached on a port which is unassigned by any hosts. In step 303, the management server 210 executes Copy specified golden image volume to the created volume. The golden image volume has a VM image file. It may be formatted by file system.

In FIG. 3(*b*) for storing VMs, the management server 210 in step 304 executes Stop VMs act to initiate the hypervisor to stop virtual machine. In step 305, the management server 210 executes Detach VOLs act to detach LUNs from specified volumes. The LUNs are assumed to be on the host assigned port 282. In step 306, the management server 210 executes Attach VOLs to LUNs act to attach LUNs to specified volumes. The LUNs are on the host unassigned port 281.

In FIG. 4 for deploying VMs, the management server 210 in step 307 executes Detach VOLs from LUNs act to detach VOLs from LUN on the host unassigned port 281. In step 308, the management server 210 executes Attach VOLs to LUN act to attach VOLs to LUN on the host assigned port 282. In step 309, the management server 210 executes Deploy VMs act to deploy VMs requesting hypervisor to run VMs on the LUNs.

FIG. 5 shows example of an executed plans table providing details for a list of executed plans. The table has columns of job ID 501, Plan 502, Number of VMs 503, and VM IDs 504. As an example, the user executes Create VMs Plan in job ID #1. The user specifies the number of VMs as 100. The VM IDs are returned after plan execution. Another example is job ID #3 to Store VMs. The user executes StoreVM with 3 as the number of VMs and 1, 4, 6 as target VM IDs.

FIG. 6 shows an example of a queue table on the selector 213 of FIG. 2 for storage operations toward each I/F. This example is for the LUN queue. The table has columns of Queue item number 601, Plan's Job Number 602, Storage Operation 603, and Parameters 604 for the storage operation. The queue is first-in-first-out (FIFO). For example, item #1 on the queue 601 is executed first by serial execution of the items in ascending order. In batch style execution, the selector 213 selects a set of queue items. For example, the selector 213 selects queue item numbers 1 to 3 on the queue and executes them all at once. The number of queue item numbers to be executed at once may be specified.

FIG. 7 shows an example of a batch table for batch storage operations 151 on the SVP 150 of FIG. 2. The batch table has columns of Queue item number 701, Storage Operation 702, and Parameters 703 for the storage operation. Based on a batch request from the management server 210, the SVP 150 executes the storage operations by batch.

FIG. 8 shows an example of an operation queue table for queue storage operations 161 on the MP 160 of FIG. 2. The operation queue table has columns of Queue item number 801, Storage Operation 802, and Parameters 803 for the storage operation. On the MP 160, the process of the storage operation is change directly on the configuration table 171. Therefore, the LUN operation is executed in the storage subsystem 240 according to each I/O operation from the management server 210. Moreover, the storage subsystem 240 receives storage operations from several applications including the management server 210. They are in this queue. In case the queue is full, the storage subsystem 240 will slow down the execution of the processes. To ascertain the condition of the MP 160, there is provided the current queue length 804 and the maximum queue length 805. The current queue length is defined by the MP's processing speed and the maximum queue length is defined by the memory size on the MP 160.

FIG. 9 shows an example of a configuration table 171 on the storage subsystem 240. The list shows specifically volume (VOL)-LU mapping. The configuration table 171 has columns of volume number 901, Port #902, and LUN 903. The Port # is associated with the world wide name (WWN). In this embodiment, the host assigned port is port #0 and the host unassigned port is port #1. Other numbers can be used. The configuration table 171 is modified by the MP 160 and SVP 150. Therefore, there is a lock for the configuration table 171. The lock may be a range lock, which is to take a lock for several VOL records associated with Port field and LU field by a processor thread, or a whole lock, which is to take a lock for the whole configuration table, to protect the configuration table 171. This embodiment involves the use of a pool table, which is known in the art and hence details are not provided. Based on this VOL-LU mapping, the MP 160 processes read/write operations to the appropriate volume via a LU on a port. The access of such operations is known in the art and hence no detailed discussion is provided.

FIG. 10 shows examples of flow diagrams illustrating how the MP 160 or the SVP 150 modifies the configuration table 171. The MP case is described first. As mentioned above, the MP 160 modifies the configuration table 171 in the memory 170 directly based on the latest entry of FIG. 8. Before the operation, the MP 160 takes a lock for the latest entry of the operation queue table in the memory 170, and then modifies the value. In the case of (a) to attach LUN in FIG. 10, the MP 160 adds a LUN for the target volume on the configuration table. In the case of (b) to detach LUN, the MP 160 deletes a LUN for the target volume on the configuration table. In the case of (c) to create volume, the MP 160 creates a new volume number without LUN number on the table. In the case of (d) to delete volume, the MP 160 deletes a volume number on the configuration table. For the SVP case, as mentioned above, the SVP 150 takes a lock, loads a portion or whole of the configuration table 171, modifies it, and loads it on the memory 170. The modification is executed in the same way as in the MP case for cases (a) to (d).

FIG. 11 shows an example of a flow diagram illustrating how the selector 213 selects a provider 214, 215. The basic sequence is that the selector 213 collects each provider's status and then selects a provider. In step 1101, the selector 213 checks the current system condition in relation to the status information of the provider. Based on the provider's status information, the selector 213 selects an intercept (c) for I/F 1. The selection is illustrated in the intercepts table of FIG. 12(a) which has columns of condition 1201 and intercept 1202. Under normal condition, the intercept is c2. On internal load configuration table, referred to as "refresh" (uploading the configuration table 171 in memory 170 as the Config 152 in the SVP 150 and then downloading after setting operations), the intercept becomes c1. When the SVP 150 is modifying Config 152 on the SVP, referred to as "updating" (no need to upload from the memory 170 but only to download to the memory 170 for update), the intercept moves down to c3. To retrieve the storage condition, the SVP 150 on storage subsystem 240 provides an inquiry command using its format such as RMI and then returns the result of the status (normal, refresh, or updating). The selection may use API behavior. For example, the SVP 150 returns a warning as refreshing after execution of the storage operations. Then the selector 213 changes the intercept to "refresh" (c1). Alternatively, the SVP 150 returns the result faster than the expected time. Then the selector 213 changes the intercept to "updating" (c3) as the behavior. The benefit of finding the condition of the SVP is that the management software does not require tight integration.

In step 1102, the selector 213 checks the current system condition in relation to the status information of the provider. Based on the provider's status information, the selector 213 selects a slope (a) for I/F 2. The selection is illustrated in the slopes table of FIG. 12(b) which has columns of number of queue 1205 and slope 1206. Based on the number of queue length in the MP 160 (1205), the MP 160 selects the slope (1206). To retrieve the storage condition, the SVP 150 on the storage subsystem 240 provides an inquiry command using its own API and then returns the result of status for the queue length. The queue may be located on the provider 215 without inquiry to the MP 160. In this case, the queue length management is not precise as compared to that of the storage subsystem. On the other hand, the benefit of finding the condition of the MP is that it does not require tight integration and there is low overhead for the MP 160.

In step 1103, the selector 213 calculates a crossing point as LUN(x) (1201) based on the operation time as a function of the number of LUNs, which is indicated by x, for the two interfaces. FIG. 12(c) is a plot graphically illustrating a sample calculation of a crossing point between the operational characteristics of two interfaces, namely, I/F 1 and I/F 2. The calculation is that LUN(x) (1201)=intercept(c) (1204)/(slope(b) (1203)–slope(a)(1202)). The slope (a) with intercept (c) is SVP's operation. If the number of LUs is less than x, IF/2 is selected, and if the number of LUs is greater than x, IF1 is selected in order to decrease the operation time.

FIG. 12(c) shows a crossing point LUN(x) between the normal slope(a) for I/F 1 and the queued zero slope(b) for I/F 2 (i.e., empty queue). Other crossing points can be determined based on the refresh slope or the updating slope for I/F 1 and on the queued max slope for I/F 2 (i.e., full queue). As seen in FIG. 12(c), five other crossing points are possible for those other scenarios. In FIG. 12(c), the operation time is zero when the number of LUN is zero for I/F 2 (queue interface) involving queue storage operations, but the operation time is nonzero when the number of LUN is zero for I/F 1 (batch interface) involving batch storage operations due to overhead of uploading and downloading of the Config 152.

In step 1104, the selector 213 evaluates the current queue for operations. If number of LUNs is higher than the crossing point LUN(x), the selector 213 proceeds to step 1105; otherwise, the selector 213 proceeds to step 1106. In step 1105, the selector 213 requests to execute the storage operations in Provider 1 as batch process. In step 1106, the selector 213 requests to execute the storage operations in Provider 2 as serial process.

According to FIGS. 11 and 12, the selector 213 collects information on status of each of the providers 214, 215; based on the status of each provider, determines an operational characteristic of operation time as a function of a number of operational units for each provider (operational units being LUNs in this example); compares the operational characteristics of the providers; for a given number of operational units in the received storage operations to be processed, selects from among the providers one provider which has the lowest operation time for the given number of operational units; and identifies the interface based on the selected provider to be used for executing the received storage operations via the identified interface on the corresponding processor. The providers include a queue provider configured to execute storage operations on the storage processor (MP) 160 and a batch provider configured to execute storage operations on the service processor (SVP) 150. The status of the queue provider depends on a size of the queue for storage operations between the zero queue mode and maximum queue mode. The operation time increases with the size of the queue, and the maximum queue mode requires maximum operation time and the zero queue mode requires minimum operation time.

The subsystem status information is located in the storage subsystem 240 and it is possible to retrieve the information using the I/F (Interface). The benefit is that the management software can precisely control the system. In the example of FIG. 12, there are two providers. In other examples, there may be more than two providers if the characteristics are different. In that case, step 1101 and/or step 1102 are expanded to perform status checking and select intercept or slope based on their definitions or characteristics. Furthermore, FIG. 12(c) shows straight lines in the plots for simplicity. In general, the lines may be curved. The determination of a crossing point between I/F 1 and I/F 2 is conceptually the same for curved lines as for straight lines.

Of course, the system configurations illustrated in FIGS. 1 and 2 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for selecting an interface by queue and workload for storage operation. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of selecting an interface from a plurality of interfaces in a storage subsystem for processing storage operations received by the storage subsystem, by a selector in a management server coupled with the storage subsystem via a network, the plurality of interfaces including a queue interface for queue storage operations and a batch interface for batch storage operations, each interface being associated with a corresponding processor of a plurality of processors in the storage subsystem, the management server having a plurality of providers, including a first provider configured to execute storage operations on a first processor via the batch interface and a second provider configured to execute storage operations on a second processor via the queue interface, the method comprising:

collecting information on status of the first provider and the second provider;

based on the status of the first provider and the second provider, determining an operational characteristic of operation time as a function of a number of operational units for each provider;

comparing the operational characteristics of the providers;

for a given number of operational units in the received storage operations to be processed, selecting the first provider or the second provider which has the lowest operation time for the given number of operational units;

if the first provider is selected, executing the received storage operations via the batch interface by a first processor; and if the second provider is selected, executing the received storage operations via the queue interface by a second processor;

wherein the first provider is a batch provider and the first processor is a service processor;

wherein the status of the batch provider depends on whether the service processor operates under normal mode, refresh mode, or updating mode;

wherein the refresh mode requires more operation time than the normal mode, for uploading configuration stored in a memory of the storage subsystem to the first provider and downloading the configuration from the first provider to the memory after modifying the configuration based on the received storage operations; and wherein the updating mode requires less operation time than the normal mode, for downloading the configuration from the first provider to the memory after modifying the configuration without need to upload configuration stored in the memory of the storage subsystem to the first provider.

2. The method according to claim 1, wherein the second provider is a queue provider and the second processor is a storage processor, and, if the second provider is selected, the second provider executes the received storage operations in series via the queue interface on the storage processor.

3. The method according to claim 1, wherein the first provider is a batch provider and the first processor is a service processor, and, if the first provider is selected, the first provider executes the received storage operations in batch via the batch interface on the service processor.

4. The method according to claim 1, wherein the second provider is a queue provider and the second processor is a storage processor;

wherein the status of the queue provider depends on a size of a queue for storage operations between zero queue mode and maximum queue mode; and wherein the operation time increases with the size of the queue, and the maximum queue mode requires maximum operation time and the zero queue mode requires minimum operation time.

5. The method according to claim 1, wherein modifying the configuration includes one or more of attaching logical unit number, detaching logical unit number, creating volume, and deleting volume.

6. The method according to claim 1, wherein the operational units are logical unit numbers.

7. A management server in an information system which includes a storage subsystem and one or more host computers coupled via a network with the management server, wherein the storage subsystem has a plurality of interfaces, which include a queue interface for queue storage operations and a batch interface for batch storage operations, each interface being associated with a corresponding processor of a plurality of processors in the storage subsystem for processing storage operations received by the storage subsystem, the management server comprising:
- a plurality of providers, including a first provider configured to execute storage operations on a first processor via the batch interface and a second provider configured to execute storage operations on a second processor via the queue interface; and
- a selector configured to
  - collect information on status of the first provider and the second providers;
  - based on the status of the first provider, and the second provider, determine an operational characteristic of operation time as a function of a number of operational units for each provider;
  - compare the operational characteristics of the providers;
  - for a given number of operational units in the received storage operations to be processed, select the first provider or the second provider which has the lowest operation time for the given number of operational units;
  - if the first provider is selected, execute the received storage operations via the batch interface by a first processor; and
  - if the second provider is selected, execute the received storage operations via the queue interface by a second processor;
- wherein the first provider is a batch provider and the first processor is a service processor;
- wherein the status of the batch provider depends on whether the service processor operates under normal mode, refresh mode, or updating mode;
- wherein the refresh mode requires more operation time than the normal mode, for uploading configuration stored in a memory of the storage subsystem to the first provider and downloading the configuration from the first provider to the memory after modifying the configuration based on the received storage operations; and
- wherein the updating mode requires less operation time than the normal mode, for downloading the configuration from the first provider to the memory alter modifying the configuration without need to upload configuration stored in the memory of the storage subsystem to the first provider.

8. The management server according to claim 7, wherein the second provider is a queue provider and the second processor is a storage processor, and, if the second provider is selected, the second provider executes the received storage operations in series via the queue interface on the storage processor.

9. The management server according to claim 7, wherein the first provider is a batch provider and the first processor is a service processor, and, if the first provider is selected, the first provider executes the received storage operations in batch via the batch interface on the service processor.

10. The management server according to claim 7, wherein the second provider is a queue provider and the second processor is a storage processor;
wherein the status of the queue provider depends on a size of a queue for storage operations between zero queue mode and maximum queue mode; and
wherein the operation time increases with the size of the queue, and the maximum queue mode requires maximum operation time and the zero queue mode requires minimum operation time.

11. The management server according to claim 8, wherein modifying the configuration includes one or more of attaching logical unit number, detaching logical unit number, creating volume, and deleting volume.

12. The management server according to claim 7, wherein the operational units are logical unit numbers.

13. A non-transitory computer-readable storage medium storing a plurality of instructions for controlling a data processor in a management server to select an interface from a plurality of interfaces in a storage subsystem for processing storage operations received by the storage subsystem, the storage subsystem being coupled with the management server via a network, the plurality of interfaces including a queue interface for queue storage operations and a batch interface for batch storage operations, each interface being associated with a corresponding processor of a plurality of processors in the storage subsystem for processing storage operations received by the storage subsystem, the management server having a plurality of providers, including a first provider configured to execute storage operations on a first processor via the batch interface and a second provider configured to execute storage operations on a second processor via the queue interface, the plurality of instructions comprising:
- instructions that cause the data processor to collect information on status of the first provider and the second provider;
- instructions that cause the data processor to, based on the status of each provider, determine an operational characteristic of operation time as a function of a number of operational units for each provider;
- instructions that cause the data processor to compare the operational characteristics of the providers;
- instructions that cause the data processor to, for a given number of operational units in the received storage operations to be processed, select the first provider or the second provider which has the lowest operation time for the given number of operational units; and
- instructions that cause the data processor, if the first provider is selected, to execute the received storage operations via the batch interface by a first processor; and
- instructions that cause the data processor, if the second provider is selected, to execute the received storage operations via the queue interface by a second processor;
- wherein the first provider is a batch provider and the first processor is a service processor;
- wherein the status of the batch provider depends on whether the service processor operates under normal mode, refresh mode, or updating mode;
- wherein the refresh mode requires more operation time than the normal mode, for uploading configuration stored in a memory of the storage subsystem to the first provider and downloading the configuration from the first provider to the memory after modifying the configuration based on the received storage operations; and
- wherein the updating mode requires less operation time than the normal mode, for downloading the configuration from the first provider to the memory after modifying the configuration without need to upload configuration stored in the memory of the storage subsystem to the first provider.

14. The non-transitory computer-readable storage medium according to claim 13,
   wherein the second provider is a queue provider and the second processor is a storage processor, and, if the second provider is selected, the plurality of instructions further comprise instructions that cause the second provider to execute the received storage operations in series via the queue interface on the storage processor.

15. The non-transitory computer-readable storage medium according to claim 13,
   wherein the first provider is a batch provider and the first processor is a service processor, and, if the first provider is selected, the plurality of instructions further comprise instructions that cause the first provider to execute the received storage operations in batch via the batch interface on the service processor.

16. The non-transitory computer-readable storage medium according to claim 13,
   wherein the second provider is a queue provider and the second processor is a storage processor;
   wherein the status of the queue provider depends on a size of a queue for storage operations between zero queue mode and maximum queue mode; and
   wherein the operation time increases with the size of the queue, and the maximum queue mode requires maximum operation time and the zero queue mode requires minimum operation time.

17. The non-transitory computer-readable storage medium according to claim 13,
   wherein modifying the configuration includes one or more of attaching logical unit number, detaching logical unit number, creating volume, and deleting volume.

* * * * *